United States Patent [19]
Zheng et al.

[11] Patent Number: 5,119,296
[45] Date of Patent: Jun. 2, 1992

[54] METHOD AND APPARATUS FOR INPUTTING RADICAL-ENCODED CHINESE CHARACTERS

[76] Inventors: Yili Zheng; Long Zheng, both of 84-117 Xueyuan Nanlu, Beijing, China

[21] Appl. No.: 618,410

[22] Filed: Nov. 27, 1990

[30] Foreign Application Priority Data

Nov. 27, 1989 [CN] China .................................. 89108851

[51] Int. Cl.⁵ .......................................... G06F 15/00
[52] U.S. Cl. .................................................. 364/419
[58] Field of Search ................. 364/419, 900; 400/110

[56] References Cited

U.S. PATENT DOCUMENTS

| | | | |
|---|---|---|---|
| 4,505,602 | 3/1985 | Swong | 364/419 |
| 4,758,979 | 7/1988 | Chiao-Yueh | 382/13 |
| 4,920,492 | 4/1990 | Wong | 364/419 |
| 4,937,745 | 6/1990 | Camon | 364/419 |
| 4,949,260 | 8/1990 | Hsu | 364/419 |
| 4,951,202 | 8/1990 | Yan | 364/419 |

*Primary Examiner*—Dale M. Shaw
*Assistant Examiner*—Andrew Bodendorf
*Attorney, Agent, or Firm*—Reed Smith Shaw & McClay

[57] ABSTRACT

A computer-encoding method for Chinese characters and a corresponding information-processing apparatus. The six basic strokes of Chinese characters in regular script are summarized, and a number of more frequently used traditionally character-composing head radicals are selected as the basic radicals, with each basic radical encoded and properly arranged on the 26 English character key-positions of a standard computer keyboard.

9 Claims, 6 Drawing Sheets

| THE STROKE FORM | — | ∣ | ╱ | ╲ | ┐ | ╚ |
|---|---|---|---|---|---|---|
| NAME OF THE STROKE | THE HORIZONTAL STROKE | THE VERTICAL STROKE | THE LEFT-SLANTING STROKE | THE RIGHT SLANTING STROKE | UP-RIGHT CURVING | LOWER-LEFT CURVING |
| THE STROKE NUMBER | 1 | 2 | 3 | 4 | 5 | 6 |
| VARIETIES OF THE STROKE | ─、─ | 1、 ⅃ | ╱、/ | ╲ | ─、─ Z、ㄋ | ㄴ、㇄、ヽ ㄴ、ㄅ、 |

| THE STROKE FORM | — | \| | ╱ | ╲ | ⌐ | ⌊ |
|---|---|---|---|---|---|---|
| NAME OF THE STROKE | THE HORIZONTAL STROKE | THE VERTICAL STROKE | THE LEFT-SLANTING STROKE | THE RIGHT SLANTING STROKE | UP-RIGHT CURVING | LOWER-LEFT CURVING |
| THE STROKE NUMBER | 1 | 2 | 3 | 4 | 5 | 6 |
| VARIETIES OF THE STROKE | -,-. | ⸝, ⌐ | ⸝,⸝ | ⸜ | -,-, Z, フ | ⸜,⸝,⸍, L, ⸝ |

CHINESE CHARACTER KEYBOARD 10 — CPU 20 — CONVERTER MEANS 30 — CHINESE CHARACTERS FONT LIBRARY 40 — DISPLAY DEVICE 50 — PRINTER DEVICE 60

FIG. 2

| CATEGORIES OF THE INITIAL STROKE | SECTION CODE | PRIMARY RADICALS | | SUB-RADICALS | | HIGH FREQUENCY CHARACTERS |
|---|---|---|---|---|---|---|
| | | UNI-CODE PRIMARY RADICALS | BI-CODE PRIMARY RADICALS | SURROUNDING RADICALS | MISCELLANEOUS RADICALS | |
| HORIZONTAL STROKE ー | A | 一 | | 丁$_I$ | 酉$_K$ 西$_O$ 雨$_V$ | 一 |
| | B | 土$^{(出)}$ | 二 | 者$_M$ 裁$_H$ | 工$_I^{(中)}$ 示$_P$ | 动 |
| | C | 王 | 三 | 夫$_N$ | 耳$_D$ 丰$_I^{(卅)}$ 非$_K$ 长$_Z^{(米,長)}$ | 现 |
| | D | 卄 | 十 | | 廿$_A$ 甘$_B$ 其$_C$ 革$_D$ 甫$_R$ | 世 |
| | E | 木 | 大 | | 尤$_Z^{(尤)}$ | 在 |
| | F | 扌 | | | 寸$_S$ | 有 |
| | G | 石 | 厂 | 戌$_H$ | 不$_i$ 而$_L$ 页$_N$ 豕$_P$ 辰$_Z$ | 面 |
| | H | 女$^{(毋)}$ | 匚$^{(七)}$ | 弋$_S$ 戈$_M^{(戈,M)}$ | 车$_D$ 牙$_I$ 区$_N$ 臣$_X^{(E,XA)}$ | 要 |
| VERTICAL STROKE 丨 | I | 虫 | 卜 | 虍$_H$ | 止$_I$ 齿$_N$ 山$_Z^{(W,Y)}$ | 上 |
| | J | 口 | 田 | | | 国 |
| | K | 日$^{(日)}$ | 刂 | | 田$_I$ (由$_{IA}$ 甲$_{IB}$ 申$_{IC}$) | 是 |
| | L | 目 | 冂 | | 四$_U$ (罒$_W$) 且$_C$ 贝$_N^{(M,W)}$ 见$_O$ 骨$_R$ 巾$_L$ | 同 |
| LEFT-SLANTING STROKE ノ | M | 竹$^{(艹)}$ | | 毛$_H$ 气$_Y$ | 厂$_A$ 牛$_B$ 生$_C$ 攵$_N$ 千$_D$ 禾$_E$ 手$_F$ 舌$_I$ | 和 |
| | N | 人$^{(入)}$ | 丿$^{(乀)}$ | 行$_I^{(彳)}$ | 八$_S$ 食$_Z^{(饣)}$ | 的 |
| | O | 亻 | 儿 | 臼$_X$ 鸟$_J$ | 隹$_I$ 白$_K$ 自$_L$ 身$_M$ | 们 |
| | P | 忄$^{(小)}$ | 犭 | | 小$_I^{(w)}$ 心$_Z$ | 我 |
| | Q | 钅$^{(金)}$ | 斤 | 几$_Y$ | 舟$_P$ 爪$_V$ 爫$_N$ | 所 |
| | R | 月 | 车 | 夕$_S^{(夅,SN)}$ 包$_X^{(XA)}$ | 鱼$_K$ 鸟$_Z^{(乌,ZA)}$ 欠$_N$ 皮$_Y$ 片$_I$ | 然 |
| RIGHT-SLANTING STROKE ㇏ ノ | S | 言$^{(讠)}$ | | 衣$_Q$ | 立$_U$ 辛$_I$ 六$_N^{(六,NA)}$ 方$_R$ 赤$_K$ | 就 |
| | T | 病 | | 广$_G$ 门$_L$ 宀$_R$ 穴$_N$ | 扩$_Z$ 鹿$_Z$ | 度 |
| | U | 火$^{(灬)}$ | | | ⺌$_A$ 学$_B$ 兰$_C$ 米$_E$ 业$_K$ | 为 |
| | V | 氵 | | | | 水 |
| | W | 辶 | | 尸$_M$ | 衤$_N$ 礻$_S$ | 这 |
| UPPER-RIGHT CURVED STROKE ⌐ | X | 阝$^{(右)}$ | 力 | 尸$_M$ | 彐$_B$ 艮$_N$ 已$_Z^{(巳,ZA 巳,ZB)}$ 也$_I^{(巴,IA)}$ 习$_T$ | 那 |
| | Y | 阝$^{(左)}$ | 九$^{(丸)}$ | | 子$_A$ 禾$_I^{(干,IA)}$ 又$_S$ 弓$_Y$ 马$_Z$ | 了 |
| LOWER-LEFT CURVED STROKE ⌐ | Z | 纟$^{(糸)}_{(K,L,?)}$ | | 凵$_I$ | 匕$_M$ ⺄$_N$ ⺂$_S$ 母$_X$ | 发 |

| CHARACTER FORMS \ NUMBER OF UNITS | | ONE-UNIT CHARACTERS | TWO-UNIT CHARACTERS | THREE-UNIT CHARACTERS | FOUR-UNIT CHARACTERS |
|---|---|---|---|---|---|
| SINGLE FORM CHARACTERS | SINGLE RADICAL AND SIGNAL FORM | 月 | | | |
| | COMPOSITE RADICALS AND SIGNAL FORM | 重 | | | |
| DISCRETE FORM | LEFT-RIGHT FORM | | 肌 | 湘 接 散 | 州 禒 湖 鵝 碗 鵤 鏻 鸚 漫 鵓 疑 |
| | TOP-BOTTOM FORM | | 秦 | 曼 宛 盟 | 蔓 荔 藁 黎 皷 鷙 闍 照 嶽 樊 琶 |

FIG. 6

| Q 扌 | W 之(辶) | E 木 扌 | R 月 " | T 疒 ; | Y 阝 九 | U 火 丷 | I 虫 丨 | O 亻 儿 | P 忄 彡 氵 |
|---|---|---|---|---|---|---|---|---|---|
| A 一 | S 言(讠) | D 艹 十 | F 扌 | G 石 厂 | H 攵 匚 | J 口 囗 | K 日 刂 | L 目 皿 口 | : ; |
| Z 纟 | X 卩 力 | C 王 三 | V 氵 丷 | B 土 二 | N 人 丶 乂 | M 艹 | , < | . > | / ? |

FIG. 7

| CATEGORIES OF INITIAL STROKE | SECTION CODE | PRIMARY RADICALS | | SUB-RADICALS | | HIGH FREQUENCY CHARACTERS |
| --- | --- | --- | --- | --- | --- | --- |
| | | UNI-CODE PRIMARY RADICALS | BI-CODE PRIMARY RADICALS | SURROUNDING RADICALS | MISCELLANEOUS RADICALS | |
| HORIZONTAL STROKE ｜ | A | 一 | | 丁ᵢ | 酉ₖ 西ₒ 雨ᵥ | 一 |
| | B | 土⁽ᵗ⁾ | 二 | 者ₘ 裁ₕ | 工ᵢ⁽ᵗ⁾ 示ₚ 亞ᵤ | 走 |
| | C | 王 | 三 | 泰ₙ 門ᴄ | 耳ᴅ 丰ᵢ 非ₖ 镸ᶻ⁽ᵐ,⁹ˢ⁾ 馬ᵤ | 現 |
| | D | 廾 | | | 廿ₐ 甘ᴮ 其ᶜ 革ᴅ 甫ᴿ | 世 |
| | E | 木 | 十 大 | | 尤ᶻ | 在 |
| | F | 扌 | | | 寸ₛ | 有 |
| | G | 石 | 厂 | 戌ₕ | 不ᵢ 而ᴸ 頁ₙ 豕ₚ 辰ᶻ | 面 |
| | H | 女⁽ᵗ⁾ | 匚⁽ᵗ⁾ | 弋ₛ 戈ₘ⁽ⁿᴀ⁾ | 車ᴅ 牙ᵢ 區ₙ 臣ₓ⁽ᴱˣᴬ⁾ | 要 |
| VERTICAL STROKE — | I | 虫 | 卜 | 虎ₕ | 止ᵢ 齒ₙ⁽ᵁ ᵛ⁾ 山ᶻ | 上 |
| | J | 口 | 田 | | 囚ₙ | 國 |
| | K | 日⁽ᴮ⁾ | 刂 | | 田ᵢ (由ᴵᴬ 甲ᴵᴮ 申ᴵᶜ) | 是 |
| | L | 目 | 冂 | | 四ᵁ⁽ᴮᵂ⁾ 且ᶜ 貝ₙ 見ₒ 骨ᴿ 巾ᴸ 局ᴶ | 同 |
| LEFT-SLANTING STROKE ⟨ | M | 艹⁽ᵏ⁾ | 乂 | 毛ₕ 氣ᵧ | ⼈ᴬ 牛ᴮ⁽ᵇ ᵃ⁾ 生ᶜ 攵ₙ 千ᴅ 禾ᴱ 手ᶠ 舌ᵢ | 和 |
| | N | 人⁽ᵏ⁾ | 彡 | 行⁽ᵗ⁾ | 八ₛ 食ᶻ⁽ᵏ⁾ | 的 |
| | O | ⼺ | 儿 | 曰ₓ 鳥ᵢ 鼠ᶻ | 隹ₑ 白ₖ 自ᴸ 身ₘ | 們 |
| | P | 忄⁽ᴹ⁾ | 犭 | | 小⁽ᵏ⁾ᵢ 心ᶻ | 我 |
| | Q | 釒⁽ᴷ⁾ | 斤 | 几ᵧ | 舟ₚ 爪ᵥ ⽖ₙ | 所 |
| | R | 月 | 隹 | 夕ₛ (冬ˢᴺ) 勹ₓ⁽ˣᴬ⁾ | 魚ₖ 鳥ᶻ⁽ᵁᶻᴬ⁾ 欠ₙ 皮ᵧ 片ᵢ | 然 |
| RIGHT-SLANTING STROKE ⟨⟩ | S | 言⁽ᵗ⁾ | ⼎ | 衣ᵩ | 立ᵤ 辛ᴅ 六ₙ⁽ᵗ ᴺᴬ⁾ 方ᴿ 赤ₖ | 就 |
| | T | 病 | ⼎⁽ᵗ⁾ | 广ᴳ | 宀ᴿ 穴ₙ | 度 |
| | U | 火⁽ᵗ⁾ | ⺄ | | 扌ᵢ 鹿ᶻ | 為 |
| | V | 氵 | ⼄ | | ⺌ᴬ ⺍ᴮ 羊ᶜ 米ᴱ 业ₖ | 水 |
| | W | 辶 | | 戶ₘ | 衤ₙ ⻂ₛ | 道 |
| UPPER-RIGHT CURVED STROKE ⌐ | X | ⻖⁽ᵖ⁾ | 力⁽ᵏ⁾ | 阝ₘ 門ₕ 尸ₐ | 彐ₒ 艮ₙ 巳ᶻ⁽ᶻᴬ,ᶻᴮ⁾ 也ᵢ⁽ᴸᵂ⁾ 习ₜ | 那 |
| | Y | ⻏⁽ᵗ⁾ | 九 | | 子ₐ 矛ᵢ⁽ᶻᴺ⁾ 又ₛ | 了 |
| LOWER-LEFT CURVED STROKE ⌐ | Z | 幺⁽ᴮ⁾⁽ᴸ,ʸ⁾ | | 凵ᵢ | 匕ₘ ⺂ₙ 厶ₛ 毋ₓ | 經 |

METHOD AND APPARATUS FOR INPUTTING RADICAL-ENCODED CHINESE CHARACTERS

FIELD OF THE INVENTION

The present invention relates generally to a method and apparatus for computer input of Chinese characters, and more particularly, the invention relates to a method and apparatus for inputting Chinese characters into a computer by means of breaking the Chinese characters into component radicals. A computer's standard alphanumeric keys are used in a novel manner to represent the radicals, and thereby provide a means for entering the encoded radicals of the Chinese characters into the computer.

BACKGROUND OF THE INVENTION

While computers are now widely used in China, there remains a continuing problem of inputting Chinese characters into computers quickly and conveniently. Because the complicated structure of Chinese characters is very different from the relatively simple alphabetic system of western languages, the traditional computer input/output technology is inadequate to handle the input of Chinese characters. Despite the appearance of several encoding systems for Chinese character in recent years, there remain technical problems which prevent acceptance of these input techniques.

The existing systems include those based on the "PinYin" (phonetic) system, a combination of the PinYin system and character form techniques, whole character encoding, stroke input encoding, and stoke form encoding. The problems with these systems range from the existence of too many synonym codes (i.e., degeneracies), to difficultly in use, to inefficiency leading to slow input speed. Other encoding systems, while high in speed, are poorly described, thereby leading to confusion. Finally, some systems are overly cumbersome due to an overly detailed structural representation, and others fail to use the standard 26 character English character keyboard. In short, there are limiting problems with all current systems. Attempts to compensate for such shortcomings within a computer software system provide an inadequate solution.

The PinYin encoding system presents several advantages over other systems. First, it is already part of the curriculum of China's primary schools and many people are therefore familiar with the system. Additionally, since PinYin uses English characters as its encoding characters, it is a simple matter to directly encode Chinese characters by using standard English character computer keyboards. However, since the output of the PinYin encoding system consists of Chinese characters, and not the PinYin forms of those characters, too many degenerate cases result. Though some software processing can be used to compensate for this effect, it is inadequate. For a language such as Chinese, with its many dialects and slangs, there are simply too many Chinese characters for the user to remember or pronounce correctly. Finally, in Taiwan, Chinese characters are denoted with different phonetic symbols, not English letters. Therefore, PinYin faces a special barrier in Taiwan and other Asian countries.

The "PinYin-form" combination system requires that the user master two aspects of Chinese characters: their pronunciation and their written form. This is inconvenient in that the user must perform two operations. First the sound and form of the character must be determined, then the information is entered into the computer by combining them together.

The whole character keyboard is based on the use of a special hardware keyboard, rather than the standard English language keyboard. Additionally, the input speed of this system is very slow and is not suitable for wide use.

Although the stroke input encoding system is easy to learn, it presents too many degenerate cases and is not suitable for entering large amounts of data.

The stoke form encoding system is based on a process of first determining the radicals of the characters, then encoding them according to an established set of rules. The stoke form systems developed to date, however, have suffered from the lack of a suitably developed theoretical structure. Therefore, the system still suffers from a large number of synonym codes and slow input speed. It is also difficult to use.

The present invention overcomes these disadvantages by providing a more effective method of character encoding by taking into account the analysis of the individual characters.

SUMMARY OF THE INVENTION

Accordingly, it is a primary object of the present invention to provide a computer-encoding system for the Chinese characters, developed on the principle of scientific analysis of the historical evolution of the Chinese language. The system has thoroughly clarified the coherence and differences between single-form Chinese characters (pictographs and self-explanatory characters), head radicals which indicate the meaning of Chinese characters, and radicals which are the carefully chosen and alphabetically arranged single Chinese characters. The present system has explored the characteristic features of the above said kinds of Chinese characters and has formulated a system of encoding Chinese characters in regular script.

The present invention utilizes a novel computer-input system of Chinese characters which uses some traditional head radicals as basic radicals (single radicals), and classifies them into six groups according to the primary stroke of the basic radicals and places them onto the respective keys of a standard English alphanumeric computer keyboard. The resulting encoding system and inputting keyboard is based on the decomposed basic radicals. The list of basic radicals illustrated by the invention serves as the standard for decomposing all the Chinese characters. The present method of using the codes of the invention ensures encoding of all Chinese characters by using four characters at most with a reduction in duplicate codes. The present system is therefore easy for the operator to learn, remember and use.

Another object of the present invention is to provide a new type of information processing apparatus for Chinese characters using the above said input system, which can conveniently and accurately input information given in Chinese characters, and then store the information, or, if necessary, display, print, and finally transmit it.

Using the methods of the present invention it is possible to obtain a list of codes arranged in English alphabetically. Each single basic radical has its own independent code, and the basic radicals are ordered as shown in the sequential code list herein presented. Chinese characters with the same first radicals are comparatively concentrated according to the order of their codes and the radicals are mostly the head radicals by which the Chinese dictionaries are traditionally arranged. Thus each Chinese character takes its own proper numbered position when arranged according to their radicals.

These and other objects of the present invention are achieved by one or more of the following embodiments. In one aspect, the invention features a method of encoding Chinese characters for input into computers, comprising categorizing all the basic strokes of Chinese characters in regular script into six types: a. the horizontal stroke '—' (㈱); b. the vertical stroke '/' ('坚'); c. the left-slanting stroke '/' (㈱); d. the right-slanting stroke '\' (㈱); e. the upper-right curved stroke '㇆' (肃); and f. the lower-left curved stroke 'L' (扛). Second, 26 most frequently used radicals are selected and classified into the six categories "—, /, ノ, \, ㇆, L" according to their initial stroke forms. Then according to the natural alphabetical order of the English characters, each of the radicals is depicted by an English character, which is defined as a 'uni-code primary radical.' Third, the uni-code primary radicals are placed onto the key positions on a standard 26 key English computer keyboard. The uni-code primary radicals represent 26 radical sections respectively. Then for each of certain radical sections, one or two commonly used radicals whose forms are similar to the relevant uni-code primary radicals are chosen as 'bi-code primary radicals.' The uni-code primary radicals and the bi-code primary radicals in the same radical section are placed together onto the same key position of the keyboard. They can be denoted by the English character representing the uni-code primary radical plus another predetermined English character. Fourth, several commonly used radicals and some Chinese character components are chosen as sub-radicals and are attached to the radical section of the uni-code primary radicals with whom their forms are similar. A given sub-radical can be represented by a character denoting a uni-code primary radical (i.e., a code of the radical section) plus a character denoting its position (i.e. the letter denoting the position of the code). The uni-code primary radicals, the bi-code primary radicals and the sub radicals together form a basic radical set, which can be used as the general system for encoding Chinese. All the radicals of the radical set are single radicals, which serve as the units of radicals for encoding Chinese characters.

Encoding Chinese character according to the method of the present invention must be done according to the written order of each character's strokes (the visual order of the radicals), such as from left to right and from top to bottom. Characters are encoded first from left-to-right and then from top-to-bottom. In carrying out the method, the Chinese characters are decomposed into single radicals the then the single radicals are arranged linearly and finally the English characters denoting all the single radicals are used as the codes for the Chinese characters. However, each Chinese character can only utilize at most four English characters as its codes and therefore it is necessary to choose the single radicals and their respective codes by employing the following stipulated code-using rules.

After the single radicals are decomposed from a given Chinese character, all the characters denoting the first radicals must be determined. Under this prerequisite, two situations arise:

1. In the case where the total number of code characters denoting the radicals is less than or equal to 4, all the code characters denoting the second, or the third, or the fourth single radical must be used. However, in order to increase the encoding speed, it is sufficient to use the first code character from the second single radical if the Chinese character has only three single radicals.

2. In the case where the total number of the code characters denoting the radicals is greater than 4, if the first radical is represented by only one English character, then the second single radical and one English character from each of the last two single radical's codes (i.e. take their respective section code only) must be determined. However, if the Chinese character has only three radicals, two code characters must be used from its last radicals (i.e. the section code plus the position code).

If the first radical is denoted by only two code characters, it will be necessary to use one code character each from the last two single radicals, i.e., their respective section code must be used.

The detailed rules and the samples of the methods of using codes in this invention are shown in Table 3 an Table 4 herein.

And finally, the selected one to four code characters denoting the particular Chinese characters are input into the computer in turn on the above described English keyboard, and the code-characters are converted into a series of internal codes through the computer's converter means and software, which thereby enable the computer to choose the Chinese character needed from the Chinese character font library and perform the instructions of displaying, printing, transmission and storing.

In one aspect, the invention features a method for encoding and inputting Chinese characters into computers, comprising the steps of: (a) summarizing the basic strokes of regular characters into six types; (b) selecting 26 uni-code primary radicals which are the most frequently used character-composing head radicals and classifying said radicals into said six character types according to their initial stroke forms, wherein each uni-code primary radical represents one radical section; (c) selecting one or two bi-code primary radicals for each of said radical sections; (d) selecting sub-radicals for said radical sections wherein said sub-radicals are commonly used head radicals associated with the shapes of the uni-code primary radical of each radical section; (e) decomposing Chinese characters into linearly arranged single radicals; (f) assigning English characters which denote said single radicals as codes for Chinese characters such that each Chinese character is encoded by four or fewer English characters; and (g) inputting in sequence said four or fewer English characters into a computer via a standard English keyboard.

In another aspect the invention features an apparatus for processing Chinese characters, comprising: keyboard means for inputting codes denoting the Chinese characters; a converter means for converting the codes which have been input through the keyboard into a sequence of internal code; a Chinese characters font library mean in which patterns of many Chinese characters are stored and the pattern of each Chinese character has a corresponding sequence of internal codes; a display means for displaying the Chinese characters input; a printer means for printing the Chinese characters input; and a central processing unit means for controlling all the above means.

Other features and advantages of the invention will be apparent from the following description of the preferred embodiment, and from the claims.

DESCRIPTION OF THE DRAWINGS

In the accompanying drawings, a preferred embodiment of practicing the invention is illustrated wherein:

FIG. 2 is the total list of basic radicals (single radicals) of the simplified Chinese characters;

FIG. 3 is a listing of decomposed composite radicals;

FIG. 4 shows the shapes or the forms of Chinese characters and the sequential order of the their radicals in regular script;

FIG. 6 shows the Chinese character keyboard employed in the Chinese character information processing apparatus; and FIG. 7 is the total list of basic radicals for the non-simplified forms of Chinese characters.

DETAILED DESCRIPTION OF THE INVENTION

Figures 1, 5:
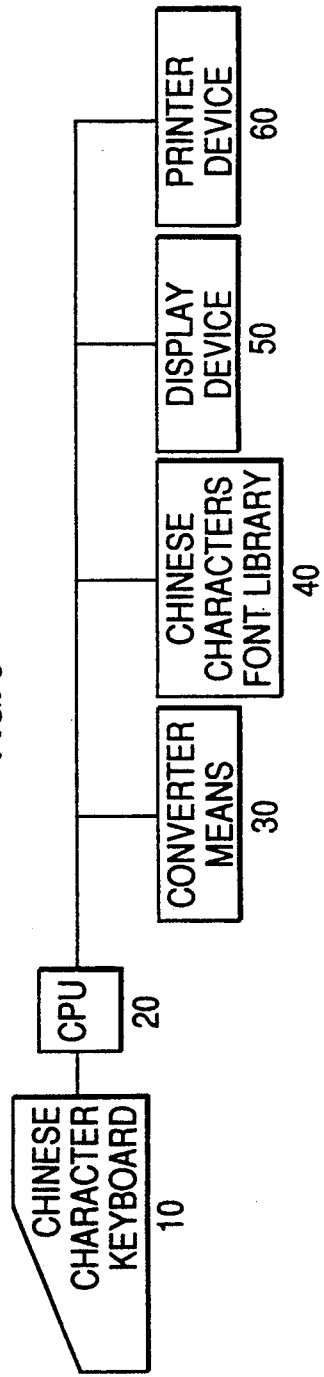
FIG. 1 shows the six basic strokes in Chinese characters in regular script.
FIG. 5 is a block diagram illustrating the various components of the information processing apparatus of the present invention.

There is an interdependent relationship between the present invention and the evolutionary development of the Chinese characters. The primitive Chinese characters either created for pictographs or ideographs are inseparable, each of them is a unit of "a picture", "a phoneme," or "an ideographic meaning", which is known as an "independent character" in philologics. The ancient Chinese scholar Xiu Sheng (Han Dynasty), induced all the ancient Chinese independent characters at about the year 500. Such independent characters can be combined into thousands of compound or composite characters. It is often the case that the component denoting the meaning of the independent characters are taken as head radicals in phonetic ideographic characters. The regularization of the Chinese characters is a major change. Carefully chosen sequentialized independent Chinese characters are currently used as radicals according to their forms as radicals. Radicals are arranged in an orderly way in the Chinese characters and are highly convenient for encoding and inputting into a computer, and for sorting and retrieving the Chinese characters according to the code sequential order.

The first radicals in the Chinese character are always at the position of the initial strokes. In the present invention strokes are the units of the forming shapes of Chinese characters in regular scrip and radicals are the units for forming the characters.

FIG. 1 shows the six basic strokes in regular Chinese characters generalized by this invention, that is, the horizontal stroke '—' (横); the vertical stroke '丨' (竖); the left-slanting stroke '丿' (撇); the right-slanting stroke '\' (捺); the upper-right curved stroke '㇆' (left-right-downward stroke); and the lower-left curved stroke 'L' (up-down-and-turn-to-right stroke). The shape (or the form), the starting-and-falling, and the orientation of the strokes are the essential manifestation of the regular classification of regular Chinese characters. Further, with respect to the six strokes, '—' and '丨', '丿' and '\', '㇆' and 'L' are always in pairs and strictly regular. This invention does not consider that the stroke '.' (dot) is a round dot, but a short slanting stroke either left-slanting dot or right-slanting dot ('丿' and '丶'). There still exist 'ƺ' and '丂' in the strokes of Chinese characters which the present invention treats as "upper right curved" strokes. Also the stroke '丂' (first up-down-and-turn-to-right and then left-right-down-ward stroke) and '乚' (first up-down-and-turn-to-right and then another up-down-and-turn-to-right stroke) are treated as "lower left curved" strokes.

FIG. 2 is a table of basic radicals (single radicals) of simplified Chinese characters according to this invention. According to the method of the present invention, the 26 most frequently used head radicals have been optimumly selected as a first set radicals and the head radicals are divided into six groups by their initial strokes, i.e., '—, 丨, 丿, \, ㇆, L.' Each of these radicals takes an English character as its code in the natural alphabetical sequence of the English characters, and are known as uni-code primary radicals. The uni-code primary radicals are placed on the 26 English-character key-positions of a standard computer keyboard and therefore are also called key-name radicals.

Radical sections are represented by 26 uni-code primary radicals. Radical section A-H corresponds to the group whose initial strokes belong to '—'; radical section I-L corresponds to the group whose initial strokes belong to '丨'; radical section M-R corresponds to the group whose initial strokes belong to '丿'; radical section S-W corresponds to the group whose initial strokes belong to '\'; radical section X-Y corresponds to the group whose initial strokes belong to '㇆' while radical section Z corresponds to the group whose initial strokes belong to 'L'. When the strokes '—, 丨, 丿, \, ㇆, L,' are themselves used as one-stroke radicals, their codes are, respectively, "A, I, M, S, X, Z". In each of some of the radical sections one or two commonly used head radicals typical for the given radical section are chosen and form a second set of radicals referred to herein as bi-code primary radicals. Each of the bi-code primary radicals is denoted by two English characters as its codes, with one being the section code, and the other being the position code. The section code is denoted by the English character the radical belongs to, while the position code is denoted by "F" in all cases.

There are 49 uni-code primary and bi-code primary radicals which are defined arbitrarily and which ideally are committed to memory. In addition, a third set of radicals including 111 commonly used head radicals and a few components are chosen as sub-radicals which are distributed to the various primary radical sections according to their respective initial stroke forms. Each of these sub-radicals is also denoted by a code comprised of two English characters. The section codes for these sub-radicals are denoted by the section codes they belong to, while their position codes are chosen from the components of the primary radicals which the sub-radicals may contain in their constitution, so that they can be easily remembered by way of association. In this way the 160 single radicals have formulated a strictly regulated system of codes under the guidance of the uni-code primary radicals and the support of the bi-code primary radicals and bi-code sub-radicals.

The system is easier for an operator to remember due to its relationship to the shapes and forms of the radicals. For example, the code for the sub-radical '頁' (Chinese for "a page") is GN, because the uni-code radical whose '丆' whose English character code is G dominates radical section G, and the bi-code primary radical '𠃌' represents the special feature of the radical shapes of this radical section. The character '頁' clearly belongs to radical section G and position code N, since it has the initial stroke feature '丿' and the constitutional component '人-N'. From the foregoing it can be seen that the 111 codes for the sub-radicals are more readily remembered once the 49 section codes for the primary radicals are known.

Sub-radicals are farther divided into "surrounding radicals" and "miscellaneous radicals". All the radicals with a surrounding structural component are defined as "surrounding radicals" and the rest are "miscellaneous radicals". With the surrounding radicals as a dividing group, the Chinese characters with the inside-outside type structure of '囗, 冂, 凵, 厂, 勹' are be treated as up-down type characters and Chinese characters with the inside-outside structure of '匚, 匸' are treated as left-right type characters. For example, the Chinese characters '功' can be treated as left-right type characters its radical sequence '工' and '力'. As another example, the Chinese character '式' has an up-down sequence, that is, the radical '弋' is on top of the radical '工' according to their decomposed radical order. It follows that the "surrounding radical" can play a role of simplifying and normalizing the Chinese characters. As for the miscellaneous radicals, though there are a large number, it is not necessary to remember them mechanically since some of them are not frequently used, while others can easily be recognized by their typed radical codes.

Figure 3:
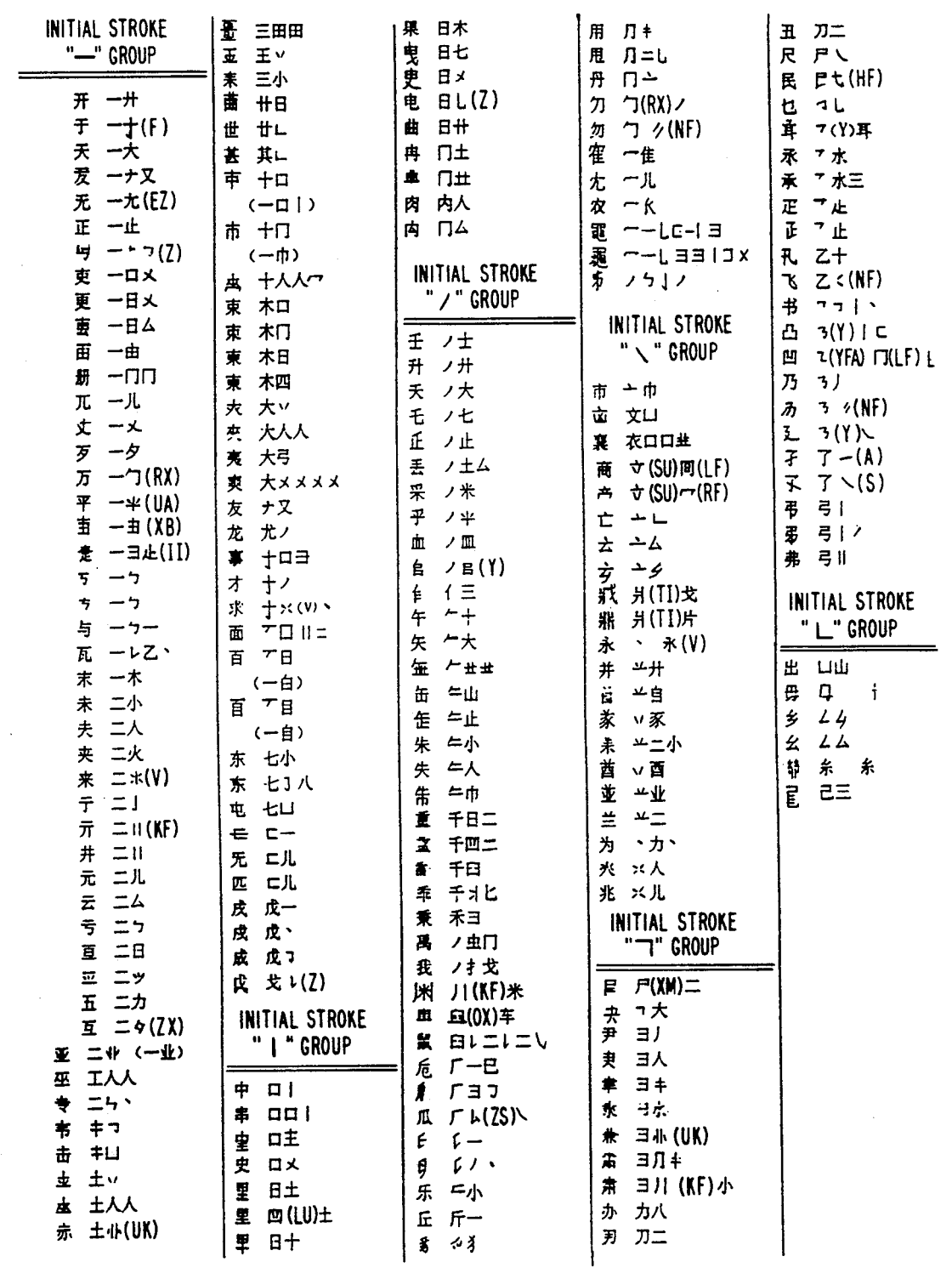

Radicals are also divided into single radicals and composite radicals. Though there could be hundreds of radicals, the present invention has only listed the most essential ones in the table of FIG. 2. Such basic radicals are called "single radicals." The radicals which are not listed in this table and which are composed of the above said basic radicals by combination are known as "composite radicals" and are shown in FIG. 3. The determination of any radicals as either single radicals or composite radicals is stipulated artificially. "discrete mode", "joined mode", "cross mode" and "miscellaneous mode", which are shown in the following table.

TABLE 1
THE STRUCTURAL MODES OF CONSTITUTION OF THE SINGLE RADICALS WITH DIFFERENT STROKES

| Radical names | Struc. mode | Explanation | Example |
|---|---|---|---|
| One stroke sing. radical | single type mode | a single stroke | 一, 丨, 丿, 丶, 乛, 乚 |
| Discrete single radical | no intersection separate type between the strokes | discrete mode | 二, 三, 冫, 氵, 丷, 丬, 丨丨, 小 |
| Joined radical | joined mode | the strokes are joined with each other | 匚, 冂, 日, 亻, 礻, 阝, 广, 弓 |
| Crossed radical | cross mode | the strokes are crossed into each other | 才, 丰, 九, 车, 也, 西, 牙, 戊 |
| miscellaneous stroke radical | miscellaneous mode | the strokes are both joined and crossed | 田, 木 |

The composite radicals are composed of single radicals, the modes of whose combination are divided four ways: the joint mode, the cross mode, the sandwich mode, and the folding mode, which are shown in the following table.

TABLE 2
THE STRUCTURAL MODES OF CONSTITUTION OF COMPOSITE RADICALS WITH SINGLE RADICALS

| Names of comp. radicals | Struc. Froms | Explanation | Example |
|---|---|---|---|
| Joined mode | Joined mode | one stroke single radical is joined with other single radicals | the radicals in 秦: 夫 is the joining of 一 and 大; the radicals in 爲:丨 is the joining of 非 and 一. |
| Folding mode composite radical | Folding mode | duplication of two single radicals of the same struc. or comp. radicals of the same struc. | The radicals of 林: 木木 is the duplication of two '木'; 圭: 土 is the duplication of two '土'; 竹: 木木 is the duplication of two 木. |
| Cross mode comp. | Cross mode | Single radical crossed with single radicals by their strokes | The radicals of 抹: 禾 is the cross of 一 and 木; 木: 木 is the cross of 一 and 小; 殳: 殳 is the cross of 几 and 又. |
| Sandwich mode composite radical | sandwich mode | Other single radicals are placed in between one single radical's top-down structure or left-right structure | the radicals of 甘: 丄 is 一 placed between 一; 丨: 丄 is two 一 placed between 二; 袁: 袁 is 口, 口 placed between 衣. |

In the structure of the forms of Chinese characters, single radicals are usually regarded as an inseparable radical unit, for example, the Chinese character '沐' is a three-unit Chinese character comprising three single radicals '氵, 木, 日' which can be used as input codes. However, the composite radicals are regarded as radical units that are separable and therefore they must be disintegrated into single radicals by following their modes of combination, i.e. folding, sandwich, crossing and joining, inversely before used to encode for input. The number of composite radicals is limited. Composite radicals can be quickly and conveniently disintegrated into single radicals no matter whether they appear in independent Chinese characters or in the structure of a Chinese character as a component as long as the single radicals concerned are known. For example, the character '鏊' is a three-unit composite radical (as shown by the figure 田, that is composed of three single radicals '束,攵,正', the composite radical '束' consists of a cross-mode radical of '木' and '口'; '攵' is a single radical, and '正' a joined mode composite radical consisting of '—' and '止'. Hence the character has to be divided into five single radicals '木, 口, 攵, —, 止' before encoding.

FIG. 3 is an example of the disintegration of composite radicals into a minimum of single radicals.

FIG. 4 shows the Chinese character forms and the order of the positions of the radicals. The Chinese character forms or types refer to the structural types formed according to certain configurative rules among the different units of the Chinese characters' radicals. The character forms are divided into single character and discrete character form. The structure of a single form character has only one radical unit, whose radical may be either single or composite. Therefore there are single form characters of single radicals (comprising one radical) and single form characters of composite radical (consisting of two, three or four single radicals). All the radicals, whether they are single radicals or composite radicals, are regarded as a radical unit, hence the single form character is of a pattern '□'. The structure of the discrete form characters is divided into left-right type and top-to-bottom type according to the configuration form among their different unit positions which are arranged according to a set rule with a set space between the radical units. The symmetrical correspondence and strict regularity of the left-right and top-to-bottom type Chinese characters can be seen clearly from FIG. 3. About 90% of Chinese characters belong to the discrete type while the number of single type characters is rather limited.

The numerals in the patterns of FIG. 4 show the sequential order of the radical units, known as radical order. The radical order is decided by the visual reading order of a radical corresponding to the traditional uniting custom. For example, the visual reading order pattern of the Chinese character '鏊' is, by which it can be disintegrated into '束,攵 ,正 ' which are called in turn "first radical, second radical and final radical". As can be readily seen, one of the radicals is a single radical while two of the radicals are composite radicals. Since this invention has revealed the general principle of the structures and the sequential order of the radicals of the Chinese characters, the spelling and reading effects of the squared (or the blocked) Chinese characters will be gradually improved as for the Western languages.

It should be noted that since composite radicals exist, the number of radical units in different forms of Chinese characters may not be equal to the number of single radicals. Thus the conception of "single radical number" is adopted in this invention and the encoding methods and rule are explained in it e.g., the above-mentioned Chinese character '鏊' is regarded as a character comprising three units and five single radicals.

Encoding according to the present invention comprises the steps of: decomposing a Chinese character into individual single radicals according to the radical order as well as the criteria of the radical table, and according to the character pattern and the constituting mode of single radicals; linearly arranging said decomposed single radical in internationally adopted character codes; and then determining the codes in accordance with the encoding rules.

The encoding rules of the invention are as follows:

A Chinese character is decomposed into single radicals and utilize the single radicals as encoding units;

The decomposed single radicals are arranged according to the visual reading sequential order of the character, such as, for example, "from left to right", "from top to bottom", and "from left to right" and then "from top to bottom";

Four or less English characters are used as codes for each Chinese character wherein the single radicals and codes are chosen according to a code determination scheme.

The code determination scheme according to this invention is based on the concept that out of all the selected basic radicals (single radicals) contemplated in the embodiment of this invention, there are at most 26 uni-code primary radicals which can be encoded as single character codes. Additionally, there are bi-code primary radicals and sub-radicals consisting of a section code and a position code. After a Chinese character is decomposed, all of the codes of the first single radical (first radical) in the position of the initial stroke are to be used as they are, that is, one English character is used for the uni-code primary radical, or both the section code and the position code are used for the bi-code primary radicals or the sub-radicals. The codes for the radicals in subsequent positions have to be chosen according to the two examples below:

In cases where the total number of the single radical codes for a Chinese character does not exceed four, the codes of the second, third and fourth radicals must be used as they are not matter whether the first radical is uni-code or bi-code. However, in order to increase the input speed, the section code of the second single radical is used but its position code may be omitted when the Chinese character has three single radicals.

For example,

推 — 扌 佳 ——→FOI
     F  OI

栗 — 覀 木 ——→AOE
    AO  E

猎 — 犭 日 日 ——→PFKK
    PF K K

信 — 亻 立 口 ——→OSJ
    O SU J

In cases where the total number of codes of the single radicals of a Chinese character is greater than four, it will be necessary to use the section code of each of the second and the last two radicals provided the first radical is a uni-code radical. The rest of the single radicals and the rest of the codes for the radicals are omitted. However, when a Chinese character has only three single radicals, the bi-code for the last radical must be used, i.e., the section code and position code of the last radical must be used. For example,

樟 — 木 立 日 丁 ——→ESKD
   E SU K DF

-continued

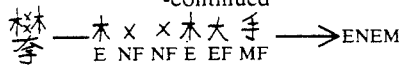—木 x x木大手——→ENEM
　　　E NF NF E EF MF

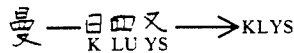—日罒又——→KLYS
　　K LU YS

If the first radical is a single bi-code radical, the section codes of each of the last two single radicals must be used to form the codes for the given Chinese character. For example,

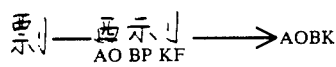—西示刂——→AOBK
　　AO BP KF

TABLE 3

THE DEFINITIONS OF SYMBOLS FOR THE ENCODING FORMULAS

| Symbols | Definition |
|---|---|
| ① | a section code of a single radical |
| ② | a section code and an appended position code for a single radical |
| Ⓝ | the number of codes of a single radical at a certain sequential position N = 1 or N = 2 |
| n | the sequential position number of code n = 1, 2, 3, . . . 10 |
| Ⓧ | all the codes of a radical at a certain sequential position are omitted |
| — | that is |
| → | be taken as |

TABLE 4

THE ENCODING FORMULAS AND THE EXAMPLES OF THEIR APPLICATION

| Number of radicals for a Chinese character | Explanation of the encoding scheme | Encoding scheme | Examples | | | |
|---|---|---|---|---|---|---|
| one sing. rad. Chinese character | "A" is appended to the radical code when a unicode radical is used as a Chinese character the radical codes themselves are used when the bicode radical is used as a Chinese character | |  — GA  — SA  — RK  — ME | | | |
| two sing. rad. Chinese character | the first and the last radicals are encoded as they are | $N_1 \; N_2 \to N_1 \; N_2$ | 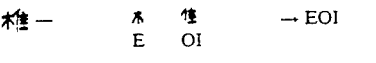 — | 木 忄 E  OI | | → EOI |
| | | | 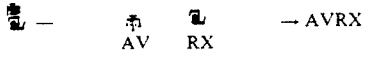 — | 雨 电 AV RX | | → AVRX |
| three sing. rad. Chinese character | one code for the first radical and one for the second radical, the whole codes are taken for the last radical | ① $N_1 \; N_2 \to$ ① ① $N_3$ | 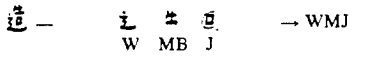 — | 辶 土 曰 W MB J | | → WMJ |
| | | | 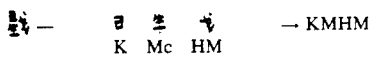 — | 弓 业 戈 K Mc HM | | → KMHM |
| | two codes for the first radical and one code each for the second and the last radical | ② $N_2 \; N_3 \to$ ② ① ① | 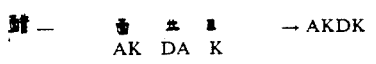 — | 酉 土 斤 AK DA K | | → AKDK |
| | | | 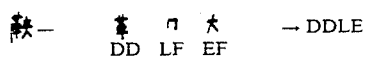 — | 鬲 冂 大 DD LF EF | | → DDLE |
| Chinese characters of more than three sing. radicals | one code for the first radical and one code each for the second and the last two radicals | ① $N_2 \; N_3 —$ $N_{N-2} \; N_{n-1} \; N_n \to$ ① ① Ⓧ — Ⓧ ① ① | 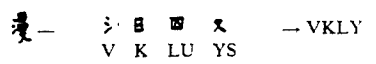 — | 氵 日 罒 又 V K LU YS | | → VKLY |
| | | |  — | 士冖 口水次 B RF RN PZ | | → BRRP |
| | two codes for the first radical and one code each for the second and the two last radicals | ② $N_2 \; N_3 —$ $N_{N-1} \; N_{n-1} \; N_n \to$ ② Ⓧ Ⓧ — x 1 1 | 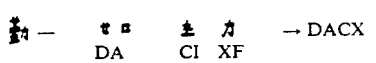 — | 生口 土 力 DA CI XF | | → DACX |
| | | |  — | 立月+文工 艮 ㄨ SU LN PZ | | → SULP |

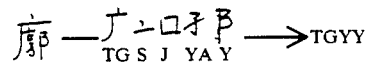—广亠口子阝——→TGYY
　　TG S J YA Y

The scheme of using codes according to the present invention can be expressed by "formulas". The definitions of symbols adopted can be found in Table 3 and the scheme to be used and the examples concerned are shown in Table 4 below.

The following measures are taken in accordance with this invention to reduce unnecessary synonym codes:

(1) "VV" is appended to the codes for Chinese characters formed of two uni-code primary radicals, e.g.:

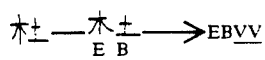—木土——→EBVV
　　E B (2) "V" is appended to the codes for Chinese characters formed of one uni-code primary radical and a high frequency Chinese character, e.g.:

胺 — 月𡈼 ——>RG<u>V</u>
     R G (3) "A" is appended to the code when a uni-code primary radical is used as a Chinese character, e.g.:
"石—GA" is used as a Chinese character
"石—G" is used as a compound radical in encoding.

(4) "V" is appended to the codes of '木,石,口,日,水' when such uni-code primary radicals used as pure top-radicals in encoding, e.g.:

只 — 口 八 ——>J<u>V</u>NS
 八   J NS

When the sub-radical ' ' is used as a pure top-radical in encoding, its position code "Z" has to be changed into "V", e.g.:

颠 — 山 十 且 八 页 ——>I<u>V</u>NG
     I(z)V    NS GN (5) Appositive radicals are provided for encoding some Chinese characters with radicals of the same stroke pattern. In such a case, one (or several) radical(s) of the same stroke pattern are treated as appositive radicals and an "A" (or "B" or "C") is appended to its code so as to form the code of the appositive radicals, e.g.: '几' is the appositive radical of '几', '几-QY' and '几-QYA'. Another example is: '田-KI', '由-KIA', '甲-KIB' and '申-KIC.'

There are 18 appositive radicals in all which are not included in the total number of the radicals.

The encoding pattern for the appositive radicals is:

③ N₂ ——>③①

②③ ——>②②

①③ ——>①③

③ N₂ N₃ ... N_{n-2} N_{n-1} N_n ——>③⊗⊗

The same code can be used for several single radicals and for radicals having similar stroke patterns so as to avoid further decomposing radicals, e.g.: '冂·LF'. Therefore all of the 冂冂冂冂冂冂冂 can be encoded as "LF". Another example: '羊-UC' and therefore '羊羊美' can be encoded as "UC". However, when the radicals themselves form Chinese characters, they must be decomposed into single radicals and encoded according to the encoding

网 — 冂 乂 乂 ——>LFNN
     LF NF NF

When '土-B'; '士-B'; '日-K'; '曰-K'; '人-N'; '入-N' in the uni-code primary radicals are used as independent Chinese characters, they should be encoded as '土-BA'; '士-BAA'; '日-KA'; '曰-KAA'; '人-NA' and '入-NAA'.

The black solid lines in the radicals of FIG. 2 table denote single radicals while the dotted lines in the radicals denote the Chinese characters after which the single radicals are named, e.g.: the single radical '丿' has its name of '丿'.

The claimed invention presents three simplified code systems to allow for high-speed input of Chinese characters. A frequently used Chinese character is arranged on each key position of a keyboard. The input code for such a character is obtained by striking the space bar after striking the given key. This is known as the first-level simplified code. The first-level simplified code can be used directly for encoding. When the key-name radicals on the original key position are used as independent Chinese characters, "A" and a space must be appended to the striking of the original key. There are about 450 characters in Chinese that need only their section codes of the first radical and second radical plus the space bar for input. Such codes are known as the second level simplified codes. There are also a few thousands of Chinese characters that adopt the simplified encoding system by using three codes (the section codes each for the first three radicals) plus a striking of the space bar for inputting, which is known as the third-level simplified codes. When simplified codes are used, the original full-code system remains working.

In order to increase input speed, the present invention provides codes for about ten thousand commonly used terms and phrases, and additionally, frequently used terminologies of special fields can also be encoded as required. These term codes can be used together with the individual character codes interchangeably without any shifting. The encoding scheme used for the terms are similar to those for individual characters. It should be noted that no matter how many characters the term may consist of, it is encoded by no more than four English characters. For example:

A one-character phrase has the character's code as its code;

Two-character phrases use the section code of respective first and second radicals of the first and the second character as its code, e.g.:

Three character phrases use the section codes of the respective first radicals of the first character and the last character and that of the first radical and second radical of the second character as its code e.g.:

编 辑 部 — 纟 车 口 立 ——>ZHJS
           Z HD J SU

Four-character phrases employ the section codes of each character, e.g.:

轻 重 缓 急 — 车 千 纟 ク ——>HMZR
              HD MD Z RF

Multi-character phrase uses the section codes of the respective first radicals of the first, second, third and the last character, e.g.:

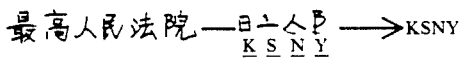

FIG. 5 shows a block diagram of the preferred apparatus for information processing of Chinese characters, which includes a keyboard 10, a central processing unit (CPU) 20, a converting device 30, a Chinese character font library 40, a display device 50, and a printer device 60.

The code of a Chinese character is input via keyboard 10 into the information processing unit 20, under whose control the code of the Chinese character is converted into a series of internal codes by the converting unit 30, which may be a mapping table in the memory device. By means of the series of internal codes a unique Chinese character can be selected from the font library 40 of the Chinese characters. Under the control of CPU 20, the Chinese character can be displayed, printed, stored and transmitted.

FIG. 6 is a schematic diagram of the keyboard according to this invention. The 26 uni-code primary radicals are sorted and arranged according to their first stroke's specific feature, and their respective codes are taken in English alphabetical order and placed on the 26 key positions correspondingly. Each key position represents a section of radicals and the keyname of the key is also taken as its section code. The boldface characters are the uni-code primary radicals (i.e. the keyname radicals), the imitation Song-style typeface character are bi-code primary radicals (whose codes are represented by the English character key-names and whose position codes are represented by a fixed "F"). All the radical codes can be affixed to the existing computer key positions.

There are no more than 200 pairs of synonym codes in this invention, which accounts for only 2.9% of the 6763 national standard (GB 2312-80) Chinese characters. Over 95% of these 200 pairs are synonym codes of two characters. When synonym codes appear, a warning beep will be given, then the most commonly used character will be displayed on the editing position of the screen. If this alternate character is chosen, the input processing can continue. If not, another character from the synonym codes can be chosen from a prompting line. Then the sequential number of the prompting code can be input so that the duplicate-code character on the editing position will be replaced by the character provided by the prompting code.

Error-tolerance codes are also provided by this invention for the characters liable to be mixed in disintegration.

When a code is not present on the keyboard and if the input code has no corresponding Chinese character, i.e., when there appear empty codes, the cursor will remain motionless and a long warning beep is sounded. A new proper code can then be input again or a prompting code can be typed in.

FIG. 7 is the total list of the radicals of non-simplified Chinese characters. The theoretical system of characters' formation, encoding method and the inputting keyboard of the present invention are also applicable for non-simplified Chinese characters. In such cases it is only necessary to convert the radicals of simplified characters in the list of simplified characters' radicals into those of non-simplified ones, for example, '区' is converted into '區' and '皮' is converted into '貝'. In doing so, some codes have to be properly changed, and added with six radicals commonly used for non-simplified form Chinese characters. Thus, a list of radicals for properly processing non-simplified characters can be prepared, as can the encoding system and information process apparatus for Chinese characters in non-simplified forms.

Although the invention has been described in detail for the purposes of illustration, it is to be understood that such detail is solely for that purpose and that variations can be made therein by those skilled in the art without departing from the spirit and scope of the invention except as it may be limited by the claims.

What is claimed is:

1. A method for encoding and inputting Chinese characters into computers, wherein each of the Chinese characters is composed of radicals each containing at least one stroke, said method comprising the steps of:
   (a) classifying initial strokes of Chinese characters into six types;
   (b) Selecting a first set of radicals including 26 radicals most frequently used when composing Chinese characters, denoting each of said first set of radicals by an English character and classifying each of said first set of radicals according to its initial stroke configuration into one of said six types, wherein each radical of said first set and said English character denotative thereof represent one radical section whereby 26 radical sections are formed;
   (c) selecting a first quantity of radical sections from among said 26 radical sections, assigning one or tow of a second set of radicals to each of said first quantity of radical sections and denoting each of said second set of radicals by a first English character specifying to which of said first quantity of radical sections the radical of said second set belongs and by a second predetermined English character, wherein the shape of each radical of said second set of radicals is related to the shape of a radical of said first set of radicals;
   (d) selecting a second quantity of radical sections from among said 26 radical sections, assigning at least one of a third set of radicals to each of said second quantity of radical sections and denoting each of said third set of radicals by a first English character specifying to which of said second quantity of radical sections the radical of said third set belongs and a second English character specifying to which of at least one of said first and second sets of radicals the radical of said third set is related in terms its shape, wherein all said first set of radicals, said second set of radicals and said third set of radicals together form a radical set and all radicals in said set are regarded as single radicals which are used when encoding Chinese characters;
   (e) decomposing Chinese characters into linear arrangements of said single radicals;
   (f) using said English characters denoting said single radicals as codes for Chinese characters such that each Chinese character is encoded by four or fewer English characters; and
   (g) inputting in sequence said four or fewer English characters into a computer via a standard English keyboard.

2. The method of claim 1, wherein said six types of initial strokes of step (a) comprise horizontal stroke ( - ), vertical stroke ( ⎮ ), left-slanting stroke ( ╱ ), right-slanting stroke (丶), left-right-downward stroke (フ) and up-down-and-turn-to-right stroke (ㄴ).

3. The method of claim 1, wherein said second predetermined English character of step (c) is F.

4. The method of claim 2, wherein step (f) further comprises:
taking the English characters of the first single radical in the linearly arranged radicals which represent a Chinese character, and the codes for other single radicals in said linearly arranged radicals are chosen such that
i) when the total number of the English characters denoting all said linearly arranged radicals for a Chinese character is four or fewer, the English characters denoting the second, third or fourth radical in the linearly arranged radicals must be utilized as said code, however, if the number for said linearly arranged radicals is three, only said English character specifying the radical section of said second single radical is utilized as said code; or
ii) when the number of the English characters denoting said linearly arranged radicals for a Chinese character is greater than four, and when said first single radical is said first kind of radical, said codes for said Chinese character comprise one English character from each of the second single radical and the last two single radicals in said linearly arranged radicals respectively, however, if said Chinese character has only three single radicals, two English characters must be utilized from said last single radical.

5. The method of claim 2, further comprising classifying doe (.) strokes of said Chinese Characters into said left-slanting dot strokes ( ⸜ ) and said right-slanting dot strokes ( ⸝ ) and classifying curving followed by turning strokes (フ) and turning followed by curving strokes (ㄴ) of said Chinese characters as said left-right-downward stroke and said up-down-and-turn-to right stroke, respectively.

6. The method of claim 2, wherein said English characters of said standard English keyboard are divided into six groups corresponding to said six types of initial strokes, wherein English characters A, B, C, D, E, F, G and H constitute a first group respectively denoting single radicals with said horizontal strokes as their initial strokes; English characters I, J, K and L constitute a second group respectively denoting single radicals with said vertical strokes as their initial strokes; English characters M, N, O, P, Q and R constitute a third group respectively denoting single radicals with said left-slanting strokes as their initial strokes; English characters S, T, U, V and W constitute a fourth group respectively denoting single radicals with said right-slanting strokes as their initial strokes; English characters X and Y constitute a fifth group respectively denoting single radicals with said left-right-downward strokes as their initial strokes; and English character Z constitutes a sixth group denoting single radicals with said up-down-turn-to-right strokes as their initial strokes.

7. The method of claim 1 wherein a space bar of said keyboard is pressed when said codes for Chinese characters are less than four English characters to delimit codes for one Chinese character from codes for another Chinese character.

8. The method of claim 1 wherein, said first set of radicals themselves are input from said keyboard as Chinese characters by pressing an appropriate English character and pressing a space bar of said keyboard after pressing the English character.

9. The method claim 4 such that, when a Chinese phrase consisting of a plurality of Chinese characters is encoded, one through four English characters are utilized as codes of said Chinese phrase, wherein:
when a Chinese phrase consisting of two Chinese characters is encoded, the English characters denoting said first single radical and said second single radical in said linearly arranged radicals for each said two Chinese character are utilized as codes of said phrase;
when a Chinese phrase consisting of three Chinese characters is encoded, the English characters denoting said first single radicals in said linearly arranged radicals for the first and third Chinese characters of said phrase and the English characters denoting said first and second single radicals in said linearly arranged radicals for the second Chinese character of said phrase are utilized as codes of said phrase;
when a Chinese phrase consisting of four Chinese characters is encoded, the English characters denoting said first single radicals in said linearly arranged radicals for each Chinese characters of said phrase are utilized as codes of said phrase; and
when a Chinese phrase consisting of more than four Chinese characters is encoded, the English characters denoting said first single radicals are said linearly arranged radicals for the first, second, third and the last Chinese characters of said Chinese phrase are utilized as codes of said phrase.

* * * * *